United States Patent [19]

Lombardo et al.

[11] Patent Number: 4,637,856
[45] Date of Patent: Jan. 20, 1987

[54] APPARATUS AND PROCESS FOR ETCHING FLUOROPLASTICS

[75] Inventors: Frank Lombardo, Warren; Edward L. Jernigan, Bristol, both of R.I.; Paul Furze, Fall River, Mass.

[73] Assignee: Dixon Industries Corporation, Bristol, R.I.

[21] Appl. No.: 808,073

[22] Filed: Dec. 12, 1985

[51] Int. Cl.⁴ .................. B29C 17/08; B44C 1/22
[52] U.S. Cl. ......................... 156/637; 156/636; 156/640; 156/668; 156/345
[58] Field of Search ............. 156/636, 637, 639, 640, 156/654, 668, 345

[56] References Cited

U.S. PATENT DOCUMENTS

| | | | |
|---|---|---|---|
| 3,411,973 | 11/1968 | Siler | 156/668 X |
| 4,331,503 | 5/1982 | Benjamin | 156/633 |
| 4,359,360 | 11/1982 | Harris et al. | 156/345 |
| 4,384,917 | 5/1983 | Wensink | 156/627 |

Primary Examiner—William A. Powell
Attorney, Agent, or Firm—Morgan & Finnegan

[57] ABSTRACT

An apparatus and process for etching fluoroplastics is disclosed. A fluoroplastic film, sheet or tape is passed under an etchant distribution means comprised of an annularly shaped and hollow main body having a series of openings therethrough. Attached to the main body are a series of annularly shaped hollow extension legs in parallel alignment with one another and in communication with said openings in the main body. Etchant is fed into the main body and by action of gravity flows into and through the hollow channels of the extension legs, exiting at the base of the extension legs, and being distributed evenly onto the side of the fluoroplastic passing under the etching distribution means. The etching distribution means also includes first and second sponge means attached to the main body on opposite sides thereof. The first and second sponge means are positioned so that they are in substantial parallel alignment iwth the fluoroplastic substrate and in contacting relationship with the surface of the fluoroplastic to be etched. The first and second sponge means contain etchant from splashing on the fluoroplastic in the areas other than the etching area. Also, a water distribution means comprising a retaining sponge means is positioned against the underside of the fluoroplastic and includes conduit means in contact with the retaining sponge means for continuous feeding a fresh supply of water which protects the unetched side of the fluoroplastic surface from being accidentially etched due to rollover of etchant.

2 Claims, 1 Drawing Figure

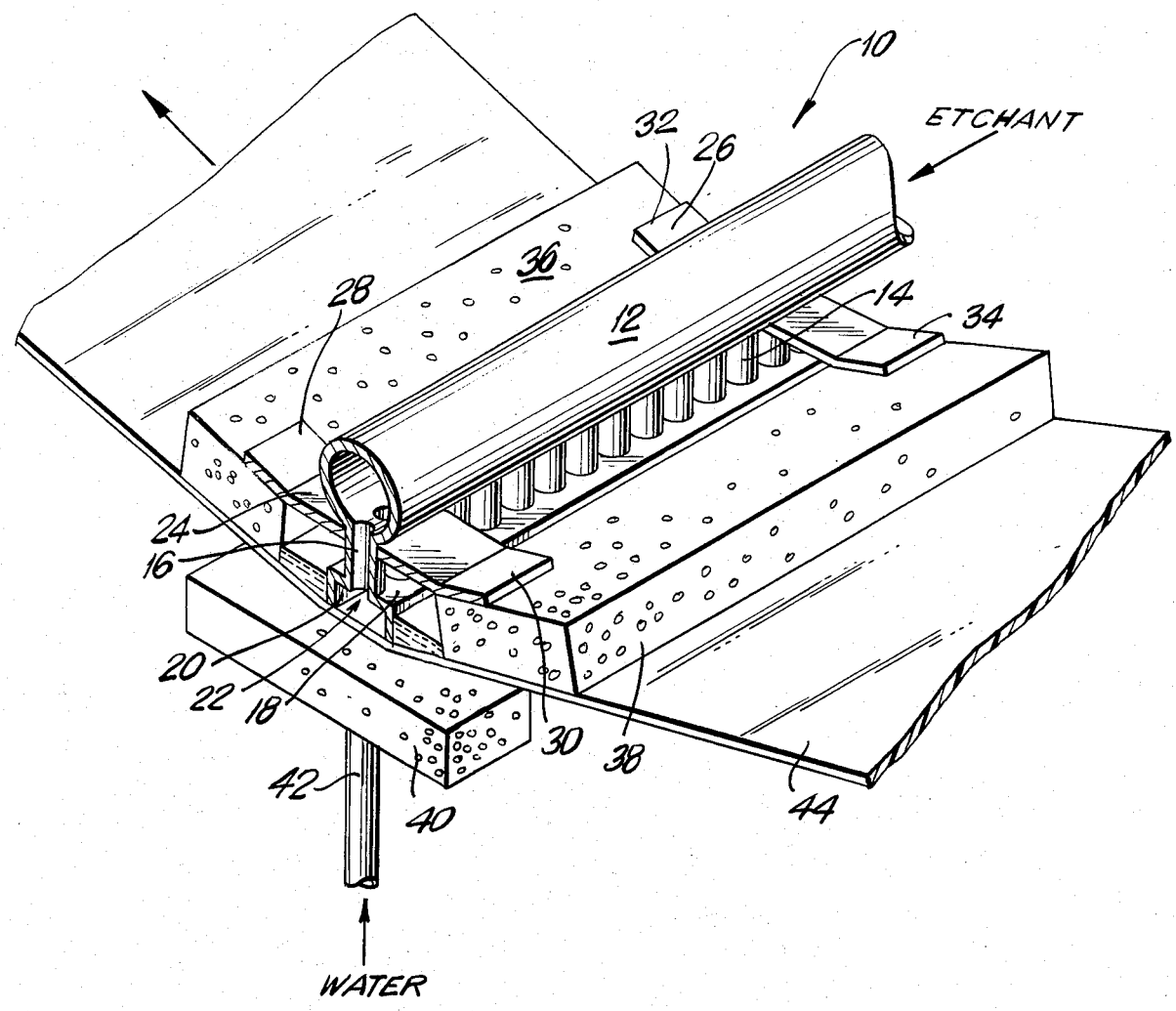

APPARATUS AND PROCESS FOR ETCHING FLUOROPLASTICS

BACKGROUND OF THE INVENTION

1. Field of the Invention

This invention relates to an apparatus and process for etching fluoroplastics.

2. Description of Prior Art

Fluoroplastics are a class of parrafinic polymers which have some or all of the hydrogen replaced by fluorine. These materials are defined by the American Society for Testing and Materials (ASTM) as plastics based upon polymers from monomers containing one or more atoms of fluorine or copolymers of such monomers with other monomers, the fluorine containing monomer(s) being present in the greatest amount by mass (ASTM D833). Fluoroplastics are made by free radical initiated polymerization or copolymerization of the monomers. Fluorocarbon plastics, those made from perfluoro monomers, include polytetrafluoroethylene (PTFE), fluorinated ethylene-propylene copolymer (FEP), and perfluoroalkoxy resin (PFA). Other fluoroplastics include ethylene-tetrafluoroethylene copolymer (ETFE), polyvinylidene fluoride (PVDF), polychlorotrifluoroethylene (PCTFE), ethylene-chlorotrifluoroethylene copolymer (ECTFE) and polyvinyl fluoride (PVF).

Fluoroplastics exhibit performance characteristics such as: resistance to harsh chemicals, a wide range of working temperatures ($-300°$ F. to $500°$ F.), outstanding electrical insulation properties, low dielectric constants and high resistivity, and very good flame resistance. Fluoroplastics also have a low coefficient of friction giving them non-adhesive and self-lubricating surface qualities.

These non-adhesive properties are a disadvantage when it is necessary to bond fluoroplastics to other materials. In such cases, the surface of the fluoroplastic to be bonded must be treated or etched so that it can accept an adhesive. Fluoroplastics can be effectively etched with a solution of metallic sodium in anhydrous ammonia. The fluoroplastic is either dipped in the etchant solution, or, if it is not to be etched all over, etchant is applied only to the surfaces to be bonded while the other surfaces are protected from the etchant. In the case of fluoroplastic tapes or sheets, in general, only one side is etched.

A common method of etchant one side of a roll of fluoroplastic tape is to spray etchant onto a steel roller and then run the side of the tape to be etched, over the roller. This applies etchant to the underside of the tape. This method wastes a great deal of etchant. The ethcant loses potency when it is exposed to moisture in the air. Fresh etchant constantly must be applied to the roller. Moreover, one-inch wide strips, along both edges of the tape, must be scrapped with this method. This is due to etchant rolling over the edge of the tape and etching the outer edges of the tape on both sides.

SUMMARY OF THE INVENTION

Objects of the Invention

It is an object of this invention to provide an apparatus and process for etching fluoroplastics which overcomes the aforementioned problems of the prior art.

An object of the present invention is to provide an apparatus and process for efficiently etching only one side of fluoroplastic tapes, films or sheets.

Another object of this invention is to provide an apparatus and process for etching fluoroplastics with fresh etchant which is supplied to the surface to be etched in discrete amounts and along a predetermined path.

Brief Description of the Invention

According to the present invention, an apparatus and process for etching one surface of a fluoroplastic substrate, in the form of a tape, film or sheet, is provided. The fluoroplastic surface is passed under an etching means. The etching means includes an etchant distribution means which comprises a generally annularly shaped main body having a hollow core extending therethrough along its longitudinal axis. One end of the hollow core defines an inlet means for the main body. One side of the main body also has a series of openings therein along its longitudinal axis and in parallel alignment with one another. Attached to the main body, preferably integrally attached or joined thereto, are a series of annularly shaped extension legs, each of which has a hollow channel extending therethrough along its longitudinal axis defining a fluid distribution path. The extension legs are in parallel alignment with one another and are spaced apart from one another alone the longitudinal axis of the main body. The longitudinal axis of each of the extension legs is transverse relative to the longitudinal axis of the main body.

Each of the hollow channels is in communication with a respective channel through an annularly shaped extension. Each of the channels has an enlarged cross-sectional area at one end thereof, (the base of the extension leg) which defines an exit means for the etchant. Each of the hollow channels has an inlet at its other end in communication with the hollow core of the main body through a respective one of the openings in the main body.

The etchant distribution means is positioned above the upper surface of the fluoroplastic substrate so that the longitudinal axis of the fluoroplastic substrate is transverse to the longitudinal axis of the body of the etching means. The base portions of the extension legs are placed in the vicinity of the fluoroplastic surface to be etched. Etchant enters the inlet means of the main body, passes through the openings in the inner walls of the main body, through the hollow channels in the extension legs and onto the surface of a fluoroplastic substrate as it passes beneath the etching distribution means.

The etching means also includes first and second means for holding first and second sponge means adjacent to and on opposite sides of the main body, referred to herein as the upstream and downstream sides. The first and second sponge means have longitudinal axis which are in substantial parallel alignment with the longitudinal axis of the main body. The first sponge means, on the upstream side of the main body, is situated in substantial contacting relationship with the upper surface of the fluoroplastic which has not yet been etched and is capable of containing etchant from splashing on the fluoroplastic surface which is upstream of the contact area. The second sponge means, on the downstream side of the main body, also is situated in substantial contacting relationship with the upper surface of the fluoroplastic which has been etched and is capable of preventing streaking on the fluoroplastic surface which is downstream of the contact area.

The etching means also includes a water distribution means adapted to be placed under the surface of the fluoroplastic substrate which is not being etched. The water distribution means comprises a retaining sponge means adapted to be placed against, or, in substantial contacting relationship with the underside of the fluoroplastic substrate, i.e., the entire surface of the fluoroplastic substrate which is not being etched and supply fresh water to such surface. The water distribution means further comprises a conduit means for continuously feeding a supply of fresh water to the retaining sponge means. The conduit means is adapted for connection to the retaining sponge means and to a source of water. The water fed retaining sponge means protects the surface of the fluoroplastic substrate which is desired to be unetched, from being accidentally etched due to rollover of etchant onto such surface during the etching process.

This invention also relates to a process for etching one side of a fluoroplastic substrate without etching the opposite side of said substrate, said process comprising:

a. passing the side of said fluoroplastic substrate to be etched directly under an etchant distribution capable of dispensing a predetermined amount of etchant per unit time onto the side to be etched;

b. dispensing the predetermined amount of etchant per unit time onto the side of the fluoroplastic substrate to be etched;

c. controlling the flow path of said etchant so that upstream of said dispensing step, splashing of etchant is substantially prevented;

d. controlling the flow path of said etchant so that downstream of said dispensing step, streaking of the etched surface is substantially prevented; and e. continuously supplying a layer of fresh water to the side of the fluoroplastic substrate which is not being etched to substantially keep said side free of etchant and prevent rollover of etchant thereon.

Other objects, aspects or advantages of the present invention will be pointed out in, or will be understood from the following detailed description provided below which is to be taken in conjunction with the accompanying drawings.

BRIEF DESCRIPTION OF THE DRAWINGS

FIG. 1 is a perspective view, partially in section, of an etchant distribution means and water distribution means according to this invention for etching fluoroplastic substrates.

DETAILED DESCRIPTION OF THE INVENTION

FIG. 1 illustrates, in perspective, an etchant distribution means according to the present invention, generally indicated by numeral 10. The etchant distribution means includes a main body 12 that is generally annularly shaped and formed from any suitable material which is inert to the etchant to be dispensed therefrom. Examples of such materials includes stainless steel, Alloy 20 steel, UHNIWPE, and any other material inert to the etchant system.

Extending from one portion of the main body 12 are a series of generally annularly shaped extension or distribution legs 14, each of which has a central channel 16 therethrough extending along its longitudinal axis. The distribution legs 14 are integrally connected to a base portion 18 of the main body 12. The base portion 18 has a cross-sectional area which is larger than that of the distribution legs 14 and has a top wall 19 and side walls 20 which define a discrete chamber 22 within which etchant may be dispensed. The main body 12 has a hollow central core therethrough extending along its longitudinal axis. The main body also has a series of openings in one part of the surface thereof. Each of the openings is in communication with a corresponding channel in one of the distribution legs 14, which are in turn, in communication with the chamber 22.

At opposite ends of the main body 12 and transversely disposed relative to the longitudinal axis of the main body are brackets 24 and 26. The brackets 24 and 26 are fixedly connected to main body 12.

The brackets 24 and 26 are generally rectangularly shaped and have ends 28 and 30 (bracket 24) and 32 and 34 (bracket 36). Ends 28 and 32 include means for releasably holding a first sponge 36 therein. Ends 30 and 34 include similar means for releasably holding a second sponge 38 therein. The releasable holding means may comprise detentes which protrude away from the brackets 24 and 26 and are capable of being inserted into, and holding, sponges 36 and 38. Additional attaching means include affixing by welding, bolting, clamping or other fastening methods, a framework to the apparatus or a self-standing fixture which will hold the sponges. The sponge may be attached by spring clamp, slide clamp, hooked on or other suitable means of attachment that offer a rapid and simple means to change the sponges. The sponges 36 and 38 are positioned via brackets 24 and 26 on opposite sides of the main body 12.

The etching distribution device 10 has a water distribution means situated below the fluoroplastic substrate to be etched. The water distribution means comprises a retaining sponge 40 continuously fed via pipe 42 with a fresh supply of water.

Suitable etchants which may be utilized in the practice of this invention include a solution of metallic sodium in anhydrous ammonia, naphthalyene, or any other liquid system, which dissolves metallic sodium without the presence of $H_2O$ and the like. However, it is understood that any known etchant for fluoroplastics may be employed.

In operation, a fluoroplastic substrate, shown as a tape 44, is fed under tension through a series of rollers (not shown) to the etching distribution means 10. The clearance for the tape is dimensioned so that the etching distribution means 10 will be substantially contiguous to the side of the tape 44 to be etched whereas the retaining sponge 40 will be substantially continguous to the underside of the tape 44 which is not being etched. Etchant is fed into the central core of the main body 12. The etchant flows through openings in the main body 12, the channels 16 within the distribution legs 14 and into the chamber 22. The distribution path for the etchant results in etchant being applied to the side of the fluoroplastic tape desired to be etched. The etchant is contained by the sponge 38 upstream of the chamber 22 which prevents splashing of etchant, and also is contained by the sponge 36 downstream of the chamber 22 to prevent streaking. The retaining sponge 40 mounted below the tape 44 is fed with a continuous supply of fresh water and protects the unetched side of the tape froc accidental etching due to rollover.

The distribution path for the etchant defined by the openings with body 12, the channels 16 within distribution legs 14 and chamber 22 limit the exposure of the etchant to the atmosphere until it is applied to the side of the tape to be etched. This increases the effectiveness of the etching process and reduces waste. Moreover, the presence of the water fed sponge 40 reduces scrap since there is no need to scrap a ½ inch strip along both edges of the tape as was done in prior processes. Further, the process of this invention provides a high quality consistent etch.

It will be apparent to those skilled in that art that various changes, modifications and uses of the present invention are possible without departing from the spirit of the invention or the scope of the appended claims in light of the above teachings.

What is claimed is:

1. An apparatus for etching one surface of a fluoroplastic substrate, the apparatus comprising:
   a. an etchant distribution means adapted to be placed over the surface of the fluoroplastic substrate to be etched, said etchant distribution means comprised of:
      (1) an annularly shaped main body having a hollow core extending therethrough along its longitudinal axis, one end of the hollow core defining an inlet for the main body, the main body also having a series of openings therein along its longitudinal axis and in parallel alignment with one another.
      (2) a series of annular shaped extension legs attached to said main body, each of the extension legs having a hollow channel extending therethrough along its longitudinal axis and being in parallel alignment with one another, the longitudinal axis of each of said extension legs being transverse relative to the longitudinal axis of said main body, each of the hollow channels having an enlarged cross-sectional area at one end thereof, which defines an exit means for said etchant, and having an inlet at its other end in communication with the hollow core of said main body through a respective one of said openings in the main body; and
      (3) first and second means for holding first and second sponge means adjacent to and on opposite sides of the main body said first and second sponge means having longitudinal axes which are in substantial parallel alignment with the longitudinal axis of said main body.
   b. a water distribution means adapted to be placed under the surface of the fluoroplastic substrate which is not being etched, said water distribution means comprised of:
      (1) a retaining sponge means adapted to be placed in substantial contacting relationship with the entire surface of the fluoroplastic substrate which is not being etched and supply fresh water to said surface;
      (2) conduit means for feeding a supply of fresh water to said retaining sponge means, said conduit means adapted for connection to said retaining sponge means and to a source of water.

2. A process for etching one side of a fluoroplastic substrate without etching the opposite side of said substrate, said process comprising:
   a. passing the side of said fluoroplastic substrate to be etched directly under an etchant distribution capable of dispensing a predetermined amount of etchant per unit time onto the side to be etched;
   b. dispensing the predetermined amount of etchant per unit time onto the side of the fluoroplastic substrate to be etched;
   c. controlling the flow path of said etchant so that upstream of said dispensing step, splashing of etchant is substantially prevented;
   d. controlling the flow path of said etchant so that downstream of said dispensing step, streaking of the etched surface is substantially prevented; and
   e. continuously supplying a layer of fresh water to the side of the fluoroplastic substrate which is not being etched to substantially keep said side free of etchant and prevent rollover of etchant thereon.

* * * * *